United States Patent
Park

(10) Patent No.: US 6,985,368 B2
(45) Date of Patent: *Jan. 10, 2006

(54) METHOD AND APPARATUS FOR OUTPUT VOLTAGE REGULATION IN PRIMARY CONTROLLED SWITCHED MODE POWER SUPPLIES

(75) Inventor: Chan Woong Park, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 10/882,376

(22) Filed: Jul. 1, 2004

(65) Prior Publication Data

US 2004/0246747 A1 Dec. 9, 2004

Related U.S. Application Data

(63) Continuation of application No. 10/287,891, filed on Nov. 5, 2002, now Pat. No. 6,775,155.

(51) Int. Cl.
*H02M 3/335* (2006.01)

(52) U.S. Cl. ........................................... 363/18
(58) Field of Classification Search ............ 363/16, 363/18, 19, 20, 21.12
See application file for complete search history.

(56) References Cited

U.S. PATENT DOCUMENTS 4,833,582 A   5/1989   Kupka
5,138,543 A   8/1992   Harm et al.
5,635,825 A   6/1997   Lesea
6,233,161 B1  5/2001   Balakrishnan et al.
2002/0093839 A1  7/2002   Bailly

FOREIGN PATENT DOCUMENTS

| DE | 1098094 | | 1/1961 |
| DE | 2160259 | | 6/1973 |
| DE | 19613453 | A1 | 4/1997 |
| EP | 0792007 | A | 8/1997 |
| EP | 1152518 | A1 | 11/2001 |
| EP | 1202441 | A1 | 5/2002 |

OTHER PUBLICATIONS

Power Integrations, Inc. "Simple Bias Supplies Using the TOP200", Data Book and Design Guide, pp. 3–191–3–196, 1996–97.

*Primary Examiner*—Adolf Berhane
(74) *Attorney, Agent, or Firm*—Blakely Sokoloff Taylor & Zafman LLP

(57) ABSTRACT

A voltage sense circuit and power supply regulation technique. In one aspect, a voltage sense circuit utilized in a power supply regulator includes a transformer including a sense winding and an output winding. A first diode is coupled to the sense winding, a first resistor is coupled to the first diode and a first capacitor coupled to the first resistor and the first diode. A second diode coupled to the first capacitor, the first resistor and the first diode. A second capacitor coupled to the second diode such that a voltage across the second capacitor is representative of a voltage across the output winding. In one embodiment, the first capacitor is discharged in a substantially shorter period of time than the second capacitor such that the second capacitor is charged substantially without influence from leakage inductance energy from the transformer.

9 Claims, 3 Drawing Sheets

METHOD AND APPARATUS FOR OUTPUT VOLTAGE REGULATION IN PRIMARY CONTROLLED SWITCHED MODE POWER SUPPLIES

REFERENCE TO PRIOR APPLICATION

This application is a continuation of and claims priority to U.S. application Ser. No. 10/287,891, filed Nov. 5, 2002, now U,S. Pat. No. 6,775,155.

BACKGROUND OF THE INVENTION

1. Field of the Invention

The present invention relates generally to power supplies and, more specifically, the present invention relates to a switched mode power supply with primary side sensing of the power supply output voltage.

2. Background Information

Electronic devices use power to operate. Switched mode power supplies or adapters are widely used to power electronic products as well as charge batteries used to power mobile products such as for example wireless phones, palm top computers, toys, etc. The output voltage of the power supply must be regulated to within a specified range depending on the product being powered. Typically this requires that the switched mode power supply includes components at the output of the power supply that sense the output voltage and provide feedback for a switched mode power supply controller or regulator which adjusts the power supply operation accordingly to maintain output regulation.

Known power supply techniques eliminate these output sense components and derive information regarding the power supply output voltage from the primary side of the power supply. However, the output voltage regulation possible with these techniques is compromised and is not acceptable to some types of products to be powered by the power supply.

SUMMARY OF THE INVENTION

A voltage sense circuit is disclosed. In one aspect, the voltage sense circuit may be employed in a power supply and includes a transformer including a sense winding and an output winding. A first diode is coupled to the sense winding, a first resistor is coupled to the first diode and a first capacitor coupled to the first resistor and the first diode. A second diode coupled to the first capacitor, the first resistor and the first diode. A second capacitor coupled to the second diode such that a voltage across the second capacitor is representative of a voltage across the output winding. In one embodiment, the first capacitor is discharged in a substantially shorter period of time than the second capacitor. Additional features and benefits of the present invention will become apparent from the detailed description and figures set forth below.

BRIEF DESCRIPTION OF THE DRAWINGS

The present invention detailed illustrated by way of example and not limitation in the accompanying figures.

DETAILED DESCRIPTION

A novel technique to improve output voltage regulation in primary controlled switched mode power supplies is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one embodiment, an improved technique for output voltage load regulation is provided. The improvement is obtained without the need for an optocoupler to provide feedback from direct output voltage sensing components and therefore provides a low cost solution.

Figure 1:
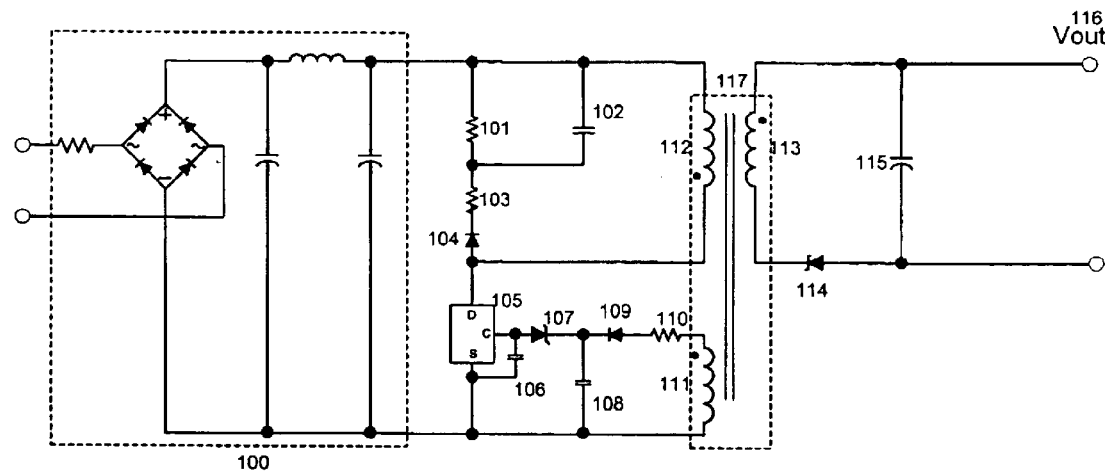
FIG. 1 is a schematic illustrating one embodiment of a power supply coupled to regulate a sense winding voltage from the primary of an energy transfer element in accordance with the teachings of the present invention.

FIG. 1 is a schematic illustrating one embodiment of a power supply in which primary side control is provided to regulate the output voltage 116 in a flyback converter power supply. The input fuse, rectification and EMI filter are shown as a single block 100 as can be appreciated to one skilled in the art. Components 101, 102, 163 and 104 form a clamp circuit, which limit the peak voltage across regulator 105. This clamp circuit is utilized due to leakage energy stored in the primary of the transformer 117. In one embodiment, regulator 105, controls the voltage across capacitor 108 by responding to feedback current in zener diode 107. Regulator 105, which for example may be a TOPSwitch from Power Integrations, San Jose, Calif., has an internal switch that is switched on and off according to the feedback current to regulate the voltage across capacitor 108. In another embodiment, a resistor could be utilized in place of zener diode 107 depending on the design of the regulator 105.

As illustrated in the embodiment of FIG. 1, the output voltage 116 at the power supply output is coupled to the output winding 113 of transformer 117. In one embodiment, the voltage across capacitor 108 is related to the output voltage 116 by the turns ratio between transformer output winding 113 and sense winding 111, assuming the forward drop of diodes 109 and 114 are equal. In the flyback power supply converter embodiment shown in FIG. 1, the output voltage 116 plus the forward diode voltage drop of diode 114, appear across output winding 113 during the off time of the regulator internal switch and while the output diode 114 is conducting.

It is appreciated that numerous second order effects may influence the relationship between the voltages across transformer sense winding 111 and transformer output winding 113. However these second order effects are ignored herein for clarity and do not influence the embodiments of the invention disclosed.

In one embodiment, a primary source of error in the relationship between the voltages across transformer windings 111 and 113 is generally due to leakage inductance voltage spikes, which differ on all three transformer windings 111, 112 and 113 depending on their relative coupling and the load on each winding. The leakage inductance spike appears at the beginning of the regulator internal switch off time. Since winding 111 is generally lightly loaded, there is a tendency for capacitor 108 to peak charge due to these leakage spikes. Consequently, the relationship between the voltage across capacitor 108 and the output voltage 116 is corrupted.

The corruption in the relationship between the voltage across capacitor 108 and the output voltage 116 varies depending on the converter output load since the leakage inductance spike energy varies according to the primary winding 112 peak current. The result is that the output voltage varies with load often to an extent that may not be acceptable for the load being powered by the power supply output.

In one embodiment, resistor 110 is coupled to sensing winding 111 and is used to form a low pass filter with capacitor 108 to partially filter the leakage inductance spike and improve load regulation. However, this alone does not always provide adequate load regulation resulting in more expensive transformer winding techniques being used to improve the coupling between windings 111 and 113 and reduce the influence of the main input winding 112 leakage inductance voltage spikes on the voltage across the other transformer windings.

Figure 2:
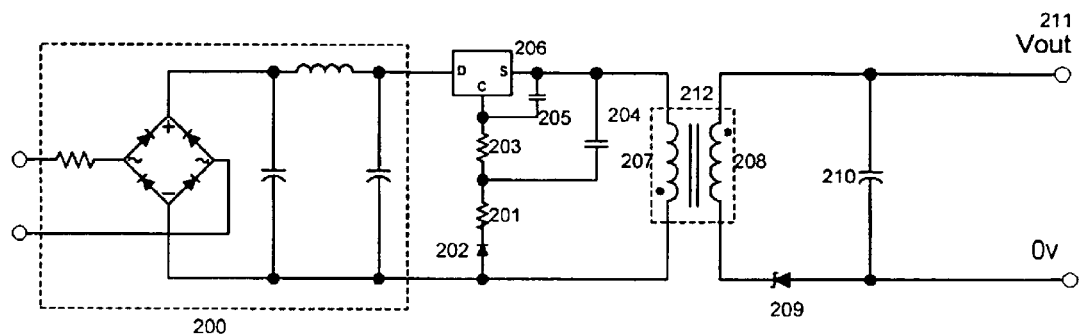
FIG. 2 is a schematic illustrating another embodiment of a power supply coupled to regulate a reflected voltage from a primary sense winding of an energy transfer element wherein the sense winding is the main primary winding in accordance with the teachings of the present invention.

FIG. 2 is a schematic illustrating another power supply embodiment in which primary side control is provided to regulate the output voltage 211 in a flyback power supply converter. The input fuse, rectification and EMI filter is shown as a single block 200 and is similar to block 100 of FIG. 1 and can be appreciated to one skilled in the art. Components 201, 202, 203 and 204 form a clamp circuit, which limits the peak voltage across regulator 206. As in the embodiment described previously in FIG. 1, this clamp is utilized to address the leakage energy stored in the primary of the transformer 212. In the embodiment of FIG. 2, this clamp circuit is also used to provide feedback to regulator 206.

In the illustrated embodiment, the voltage across capacitor 204 is related to the output voltage 211 through the turns ratio of the transformer main input winding 207 and output winding 208. In this embodiment therefore, the main transformer winding 207 also acts as the sense winding to provide information regarding the converter output voltage across output winding 208. Regulator 206, which can for example be a LinkSwitch from Power Integrations of San Jose, Calif., controls the voltage across capacitor 204 by responding to feedback current in resistor 203.

In common with the embodiment shown in FIG. 1, leakage inductance energy introduces the most significant error in the relationship between the voltages across windings 208 and 207 and again this error degrades output voltage regulation as the power converter output load conditions vary. In the illustrated embodiment, resistor 201 is included to form a low pass filter with capacitor 204 to partially filter the leakage inductance voltage spike appearing across transformer winding 207. However, again, the improvement in output voltage regulation that this resistor provides may not always be adequate for the load connected to the converter output.

Figure 3:
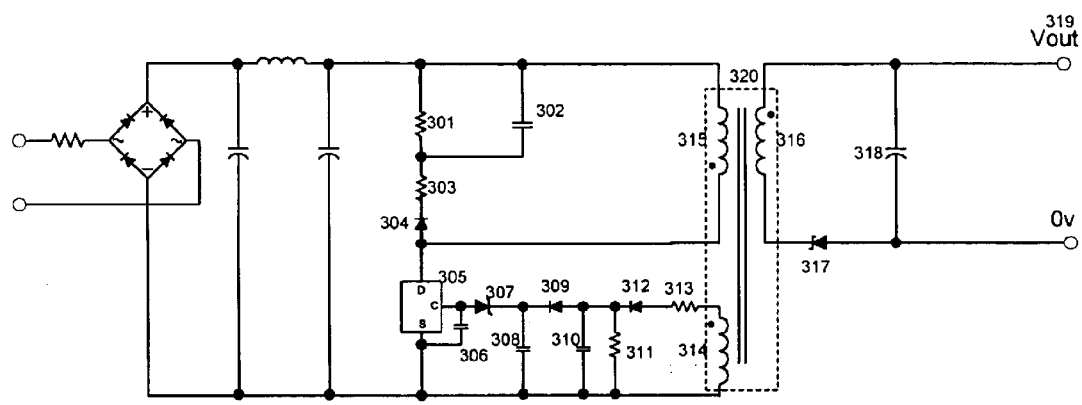
FIG. 3 is a schematic of one embodiment of a power supply with improved output load regulation in accordance with the teachings of the present invention

FIG. 3 is a circuit schematic of yet another embodiment of a power supply converter in accordance with the teachings of the present invention. When compared to the embodiment of FIG. 1, additional components have been added to the circuitry coupled to the transformer sense winding 314. These components include diode 309, capacitor 310 and resistor 311. It is appreciated of course that multiple discreet resistors may be employed to provide one or more the resistors or that multiple discreet capacitors may be employed to provide one or more of the capacitors in accordance with the teachings of the present invention.

In one embodiment, the resistor-capacitor (RC) time constant of resistor 311 and capacitor 310 is designed such that the discharge of capacitor 310 is much faster than that of capacitor 308, which in the illustrated embodiment discharges through the feedback zener diode 307 into regulator 305. In this way, the capacitor 310 has a substantially lower voltage than capacitor 308 at the start of the regulator 305 internal switch off time when the leakage inductance spike appears across sense winding 314. The leakage inductance energy therefore charges capacitor 310 substantially without influencing the voltage across capacitor 308.

In one embodiment, following the leakage inductance spike, during the period of the output diode 317 conduction, the voltage across sense winding 314 is related to the voltage across output winding 316 by the turns ratio between these windings. Capacitors 310 and 308 are therefore charged to this voltage during the conduction time of output diode 317. In this way, the voltage across capacitor 308 is a more accurate representation of the power supply output voltage 319. In the illustrated embodiment, diode 309 is coupled to prevent capacitor 308 from being discharged through resistor 311. In the illustrated embodiment, resistor 313 is coupled to sense winding 314 and forms a low pass filter with capacitor 310 to further filter the leakage inductance voltage spike. The improvement in output regulation provided by the embodiment described above, however, may allow the inclusion of resistor 313 to be optional in accordance with the teachings of the present invention.

Figure 4:
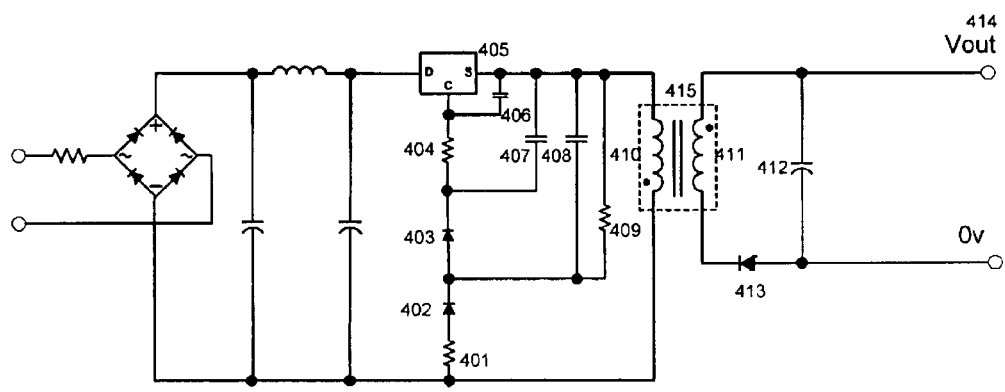
FIG. 4 is a schematic of another embodiment of a power supply with improved output load regulation in accordance with the teachings of the present invention

FIG. 4 is an illustration of another embodiment of a power supply in which the power supply output voltage regulation is improved in accordance with the teachings of the present invention. The embodiment illustrated in FIG. 4 shares similarities with the embodiment of FIG. 2 and includes three additional components, diode 403, capacitor 408 and resistor 409 to improve the converter output voltage load regulation.

In one embodiment, regulator 405 regulates the voltage across capacitor 407 by responding to a feedback current flowing through resistor 404. The RC time constant of capacitor 408 and resistor 409 is designed to be much shorter than the time constant of resistor 404 and capacitor 407. In this way, the capacitor 408 has a substantially lower voltage than capacitor 407 at the start of the regulator 405 internal switch off time when the leakage inductance spike appears across sense winding 410. The leakage inductance energy from transformer 415 therefore charges capacitor 408 substantially without influencing the voltage across capacitor 407.

In one embodiment; following the leakage inductance spike, during the period of the output diode 413 conduction, the voltage across winding 410 is related to the output winding 411 voltage by the turns ratio between these windings. Capacitors 407 and 408 are therefore charged to this voltage during the conduction time of output diode 413. In this way, the voltage across capacitor 407 is a more accurate representation of the converter output voltage 414. In one embodiment, diode 403 is included to ensure that capacitor 407 is not discharged through resistor 409. In one embodiment, resistor 401 is coupled to sense winding 410 and is included to form a low pass filter with capacitor 408 to further filter the leakage inductance voltage spike. In one embodiment, the improvement in output regulation provided by the circuitry described above, however, may allow the inclusion of resistor 401 to be optional in accordance with the teachings of the present invention.

Figure 5:
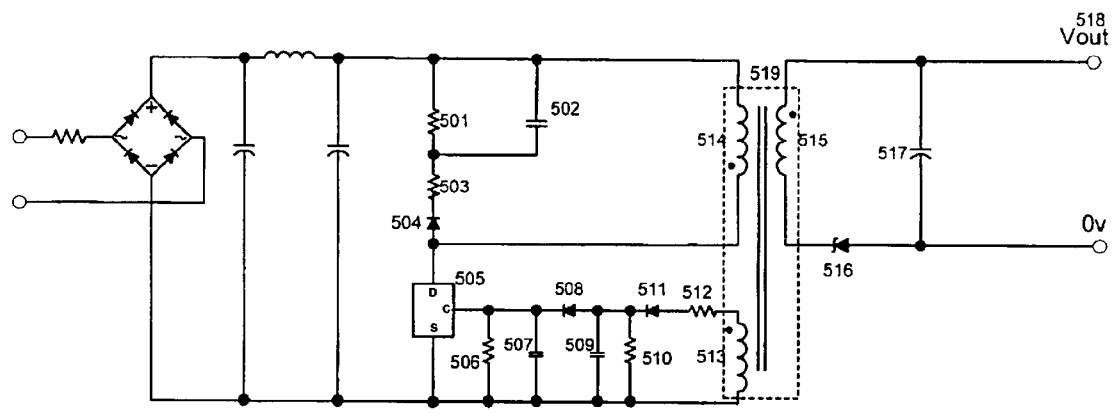
FIG. 5 is a schematic of another embodiment of a power supply with improved output load regulation in accordance with the teachings of the present invention.

FIG. 5 shows another embodiment of a power supply in which improved converter output voltage regulation is provided in accordance with the teachings of the present invention. The embodiment illustrated in FIG. 5 shares similarities with the embodiment shown in FIG. 3. In the embodiment depicted in FIG. 5, the control signal received by the regulator circuit 505 is a voltage signal and the voltage across capacitor 507 is therefore applied directly to the control pin of regulator 505. In one embodiment, resistor 506 is coupled to capacitor 507 is provides a discharge path for 507 to ensure that peak charging of capacitor 507 does not corrupt the relationship between the voltage across capacitor 507 and the voltage across the transformer output winding 515. In one embodiment, resistor 506 is chosen such that the RC time constant of capacitor 507 and resistor 506 is longer than the time constant of resistor 510 and capacitor 509. In another embodiment resistor 506 could be eliminated altogether since the input impedance of the control pin of regulator 505 is finite and therefore will discharge capacitor 507 at a rate dependent on the input impedance of the control pin of regulator 505. Again, the RC time constant of resistor 510 and capacitor 509 is chosen to be shorter than the time constant set up by the capacitor 507 and the input impedance of the control of regulator 505.

It will be appreciated to one skilled in the art that in the schematic of FIG. 4, the voltage control signal received by the regulator circuit 505 could be derived from the voltage across capacitor 507 using a resistor divider connected across capacitor 507 instead of a direct connection between the regulator circuit 505 and capacitor 507 as shown.

In the foregoing detailed description, the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A voltage sense circuit, comprising:
    an energy transfer element including a sense winding and an output winding;
    a first diode coupled to the sense winding;
    a first resistor coupled to the first diode;
    a first capacitor coupled to the first resistor and the first diode;
    a second diode coupled to the first capacitor, the first resistor and the first diode;
    a second capacitor coupled to the second diode such that a voltage across the second capacitor is representative of a voltage across the output winding; and
    an impedance coupled to the second capacitor and the second diode.

2. The voltage sense circuit of claim 1, wherein a resistor-capacitor (RC) time constant of the first resistor and first capacitor is such that the first capacitor is adapted to be discharged through the first resistor faster than the second capacitor is adapted to be discharged through the impedance.

3. The voltage sense circuit of claim 1, wherein the impedance comprises a zener diode coupled to the second capacitor and the second diode.

4. The voltage sense circuit of claim 1 wherein the impedance comprises a second resistor coupled to the second capacitor and the second diode.

5. The voltage sense circuit of claim 4 further comprising a regulator circuit coupled to sense the voltage across the second capacitor through the second resistor, wherein a current through the second resistor is a control signal to which the regulator circuit is responsive.

6. The voltage sense circuit of claim 1 further comprising a regulator circuit coupled to sense the voltage across the second capacitor, wherein the voltage across the second capacitor is a voltage feedback signal to which the regulator circuit is responsive.

7. The voltage sense circuit of claim 6 wherein the impedance comprises an input impedance of the regulator circuit coupled to the second capacitor and the second diode.

8. The voltage sense circuit of claim 1 wherein the sense winding is an input winding of the energy transfer element.

9. The voltage sense circuit of claim 1 further comprising a third resistor coupled between the sense winding and the first diode.

* * * * *